(12) United States Patent
Natori et al.

(10) Patent No.: US 10,544,864 B2
(45) Date of Patent: Jan. 28, 2020

(54) GASKET AND MANUFACTURING METHOD THEREOF

(71) Applicant: NICHIAS CORPORATION, Tokyo (JP)

(72) Inventors: Hirotaka Natori, Tokyo (JP); Tomokazu Watanabe, Tokyo (JP); Nahoko Kitajima, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 15/548,313

(22) PCT Filed: Feb. 2, 2016

(86) PCT No.: PCT/JP2016/000528
§ 371 (c)(1),
(2) Date: Aug. 2, 2017

(87) PCT Pub. No.: WO2016/125486
PCT Pub. Date: Aug. 11, 2016

(65) Prior Publication Data
US 2018/0023706 A1    Jan. 25, 2018

(30) Foreign Application Priority Data

Feb. 2, 2015  (JP) ................. 2015-018715
Feb. 2, 2015  (JP) ................. 2015-018761

(51) Int. Cl.
*F16J 15/10*       (2006.01)
*F16J 15/12*       (2006.01)

(52) U.S. Cl.
CPC .......... *F16J 15/102* (2013.01); *F16J 15/104* (2013.01); *F16J 15/108* (2013.01); *F16J 15/122* (2013.01)

(58) Field of Classification Search
CPC ........ F16J 15/102; F16J 15/104; F16J 15/108; F16J 15/122; F16J 15/10
USPC ......................................................... 277/633
See application file for complete search history.

(56) References Cited

U.S. PATENT DOCUMENTS

| 4,463,959 A | 8/1984 | Usher et al. |
| 4,477,094 A * | 10/1984 | Yamamoto ............. B32B 19/04 277/592 |
| 5,628,520 A | 5/1997 | Ueda et al. |
| 5,683,091 A | 11/1997 | Isoe et al. |
| 5,765,838 A | 6/1998 | Ueda et al. |
| 9,188,227 B2 | 11/2015 | Deluca et al. |
| 2007/0210489 A1 | 9/2007 | Itoi et al. |

(Continued)

FOREIGN PATENT DOCUMENTS

| CN | 101033386 A | 9/2007 |
| CN | 102341626 A | 2/2012 |

(Continued)

OTHER PUBLICATIONS

Nov. 22, 2018 extended European Search Report issued in Application No. 16746318.1.

(Continued)

*Primary Examiner* — Nathan Cumar
(74) *Attorney, Agent, or Firm* — Oliff PLC

(57) ABSTRACT

A gasket including a sheet part that includes exfoliated clay minerals, wherein the exfoliated clay minerals are irregularly dispersed in the sheet part without being oriented.

15 Claims, 6 Drawing Sheets

(56) References Cited

U.S. PATENT DOCUMENTS

| | | | | |
|---|---|---|---|---|
| 2009/0162672 A1* | 6/2009 | Dunn | ................... | C09K 3/1028 428/446 |
| 2009/0295103 A1* | 12/2009 | Ebina | ...................... | B32B 18/00 277/650 |
| 2012/0068415 A1 | 3/2012 | Deluca et al. | | |
| 2016/0194536 A1 | 7/2016 | Natori et al. | | |

FOREIGN PATENT DOCUMENTS

| | | |
|---|---|---|
| CN | 202215742 U | 5/2012 |
| EP | 1 247 033 B1 | 7/2005 |
| EP | 3 029 122 A1 | 6/2016 |
| GB | 2 010 417 A | 6/1979 |
| JP | H6-172058 A | 6/1994 |
| JP | H7-165470 A | 6/1995 |
| JP | 2636204 B2 | 7/1997 |
| JP | H9-315877 A | 12/1997 |
| JP | 2958440 B2 | 10/1999 |
| JP | 3163562 B2 | 5/2001 |
| JP | 3310619 B2 | 8/2002 |
| JP | 2008-013401 A | 1/2008 |
| JP | 2009-234867 A | 10/2009 |
| JP | 2009-242617 A | 10/2009 |
| JP | 2010-159428 A | 7/2010 |
| JP | 2010-159852 A | 7/2010 |
| JP | 2011-144881 A | 7/2011 |
| JP | 2011-236065 | * 11/2011 |
| JP | 2012-193750 A | 10/2012 |
| JP | 2012-201550 A | 10/2012 |
| JP | 5047490 B2 | 10/2012 |
| JP | 2013-032438 A | 2/2013 |
| JP | 2013-052680 A | 3/2013 |
| WO | 98/53022 A1 | 11/1998 |
| WO | 2010/100469 A1 | 9/2010 |
| WO | 2015/015737 A1 | 2/2015 |

OTHER PUBLICATIONS

Mar. 8, 2016 International Search Report issued in International Patent Application No. PCT/JP2016/000528.
Jun. 14, 2016 Office Action issued in Japanese Patent Application No. 2016-522837.
Aug. 8, 2017 International Preliminary Report on Patentability issued in International Patent Application No. PCT/JP2016/000528.
Mar. 27, 2018 Office Action issued in Chinese Application No. 201680008388.7.

* cited by examiner

GASKET AND MANUFACTURING METHOD THEREOF

TECHNICAL FIELD

The invention relates to a gasket and a production method thereof.

BACKGROUND ART

In general, a gasket is used to seal a fluid such as water, oil, vapor and gas in equipment, joints or the like of various pipes in a high-temperature and high-pressure state in petroleum refining, petrochemical plants, LNG plants, power plants, steel works, etc. As mentioned above, a gasket is required to exhibit excellent sealing property in a high-temperature and high-pressure state or under severe heat cycling and temperature cycling conditions.

As a gasket, a spiral-wound gasket, a serrated gasket or the like are known.

A spiral-wound gasket is obtained by winding a hoop and a filler in a stacked state. As such spiral-wound gasket, one having a basic configuration provided with a gasket main body in which the both sides thereof serve as a pressure-receiving surface that contacts the sealing surface; or an inner-ring attached, an outer-ring attached, or an inner-and-outer-ring attached one in which a metal reinforcing ring is provided on the inside, the outside or both sides of a gasket main body in order to prevent deformation of a gasket main body inwardly or outwardly by a clamping or to center the gasket main body are known.

In a serrated gasket, generally, a number of concentric circular grooves having different diameters are drilled on both surfaces of a metal main body at almost equal pitches in the radial direction, whereby the cross section has a sawtooth shape. Due to such a shape, a high surface pressure is generated on the front end portion of a sawtooth even the clamping surface pressure is low. Further, since it becomes possible to set the width (length in the radial direction) of a gasket to be narrow, a serrated gasket is suited as a gasket for equipment such as a heat exchanger in which the width of a gasket seat in a flange is narrow.

Patent Document 1 discloses a spiral-wound gasket in which expanded graphite is used as a filler. A sealing material formed of expanded graphite has sufficient elasticity and is improved in heat resistance. However, as for expanded graphite, in a temperature range exceeding 500° C. in the presence of oxygen, disappearance by oxidation of expanded graphite is promoted. Therefore, it was difficult to maintain stable sealing property for a long period of time. Patent Document 2 discloses a spiral-wound gasket in which unexfoliated mica and expanded graphite are used as a filler. However, in this spiral-wound gasket, expanded graphite disappears when used at high temperatures, and hence, sealing property cannot be maintained. Patent Document 3 discloses a spiral-wound gasket in which unexfoliated mica is used as a filler. This gasket was poor in sealing property and only a sheet having a high density could be obtained.

RELATED ART DOCUMENT

Patent Document

Patent Document 1: Japan Patent No. 3163562
Patent Document 2: Japan Patent No. 3310619
Patent Document 3: Japan Patent No. 5047490

SUMMARY OF THE INVENTION

An object of the present invention is to provide a gasket having a high sealing property and a method of producing the same.

The inventors found a sheet (sealing material) formed from exfoliated flaky clay minerals (hereinafter referred to exfoliated clay minerals) that has excellent heat resistance, has a large compression amount and has a sufficient strength for excellent handling properties, and also found that a gasket obtained by using this sheet can improve heat resistance or sealing properties of a gasket. The invention has been made based on these findings.

According to the invention, the following gasket or the like are provided.

1. A gasket comprising a sheet part that comprises exfoliated clay minerals, wherein the exfoliated clay minerals are irregularly dispersed without being oriented in the sheet part.
2. A spiral-wound gasket comprising a spiral-wound gasket main body in which a hoop and a filler are spirally wound, the filler comprising exfoliated clay minerals.
3. The gasket according to 2, wherein the sheet part futher comprises a binder.
4. The gasket according to 3, wherein the binder is one or more selected from acrylonitrile butadiene rubber, styrene butadiene rubber, polybutadiene rubber, silicone rubber, acrylic rubber, natural rubber, butyl rubber, chloroprene rubber, ethylene propylene rubber, fluororubber, urethane rubber, acrylic adhesive or silicone adhesive.
5. A spiral-wound gasket compsiring a spiral-wound gasket main body in which a hoop and a filler are spirally wound, one or both surfaces of the spiral-wound gasket main body being covered by a sheet part that comprises exfoliated clay minerals.
6. A serrated gasket comprising a serrated gasket main body, one or both surfaces of the serrated gasket main body being covered by a sheet part that comprises exfoliated clay minerals.
7. The gasket according to any one of 1 to 6, wherein the exfoliated clay minerals are natural clay or synthetic clay.
8. The gasket according to 7, wherein the natural clay or the synthetic clay is mica, vermiculite, montmorillonite, iron montmorillonite, beidellite, saponite, hectorite, stevensite or nontronite.
9. The gasket according to any one of 1 to 8, wherein the thickness of the exfoliated clay minerals is 0.5 nm to 1000 nm.
10. The gasket according to any one of 1 to 9, wherein the exfoliated clay minerals are a single layer or a laminate of two or more layers.
11. The gasket according to any one of 1 to 10, wherein the sheet part has a density of 1.6 g/cm$^3$ or less and has a compression ratio exceeding 15%.
12. The gasket according to any one of 1 to 11, wherein the gas permeation coefficient of helium gas in the thickness direction of the sheet part is $3.7 \times 10^{-5}$ cm$^2$s$^{-1}$cmHg$^{-1}$ or more.
13. The gasket according to any one of 1 to 12, wherein the quantity of leakage after repeating heating at 600° C. for 17 hours and cooling 10 times is 10 cc/min or less.
14. A method for producing a gasket comprising:
   exfoliating clay minerals to obtain exfoliated clay minerals, freeze-drying a dispersion in which the exfoliated clay minerals are dispersed, shaping the freeze-dried dispersion into a sheet part, and attaching the sheet part to a main body of a gasket.

15. A method for producing a spiral-would gasket comprising:

exfoliating clay minerals to obtain exfoliated clay minerals, freeze-drying a dispersion in which the exfoliated clay minerals are dispersed, shaping the freeze-dried dispersion into a sheet part, and using the sheet part as a filler, and winding spirally the filler and a hoop to form a gasket main body.

According to the invention, it is possible to provide a gasket having high sealing property and a production method thereof.

MODE FOR CARRYING OUT THE INVENTION

The gasket of the invention comprises a sheet part that comprises exfoliated clay minerals. In this sheet part, exfoliated clay minerals are dispersed unregularly without being oriented.

In the gasket according to one embodiment of the invention, one or both opposite main surfaces of a gasket main body is (or are) covered by a sheet part.

As the gasket, a spiral-wound gasket provided with a spiral-wound gasket main body obtained by winding a hoop and a filler spirally in a stacked state, a serrated gasket in which grooves having a sawtooth-shaped cross section are formed on one surface or both surfaces of the main body, or the like can be given.

In a gasket according to another embodiment of the invention, a spiral-wound gasket has a main body obtained by spirally winding a hoop and a filler in a stacked state, and a sheet part comprising exfoliated clay minerals is used as the filler.

When measured by the method described in the Examples, in the gasket of the invention, the quantity of leakage after repeating heating at 600° C. for 17 hours and cooling 10 times is preferably 10 cc/min or less, more preferably 5 cc/min or less and further preferably 3 cc/min or less.

Hereinbelow, an explanation is made on each embodiment

<Spiral-wound Gasket Covered by Sheet Part>

The spiral-wound gasket as a first embodiment of the invention will be explained with reference to the drawings.

Figure 1:
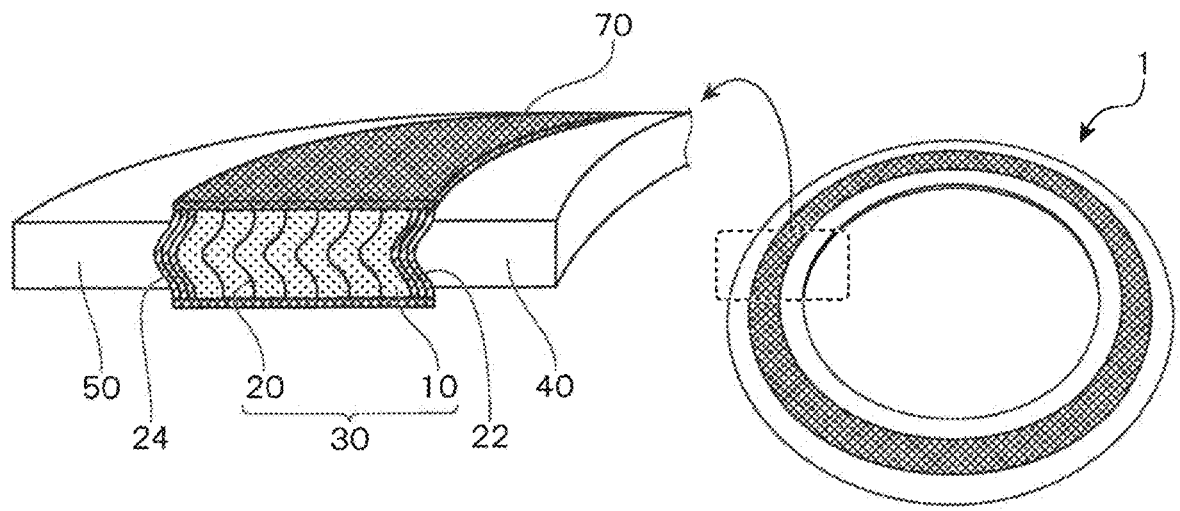
FIG. 1 is a schematic perspective view and a schematic cross-sectional view of a spiral-wound gasket as a first embodiment of the invention.

FIG. 1 is a perspective view showing one embodiment of the spiral-wound gasket. As shown in FIG. 1, a spiral-wound gasket 1 is an annular structural body.

Figure 2:
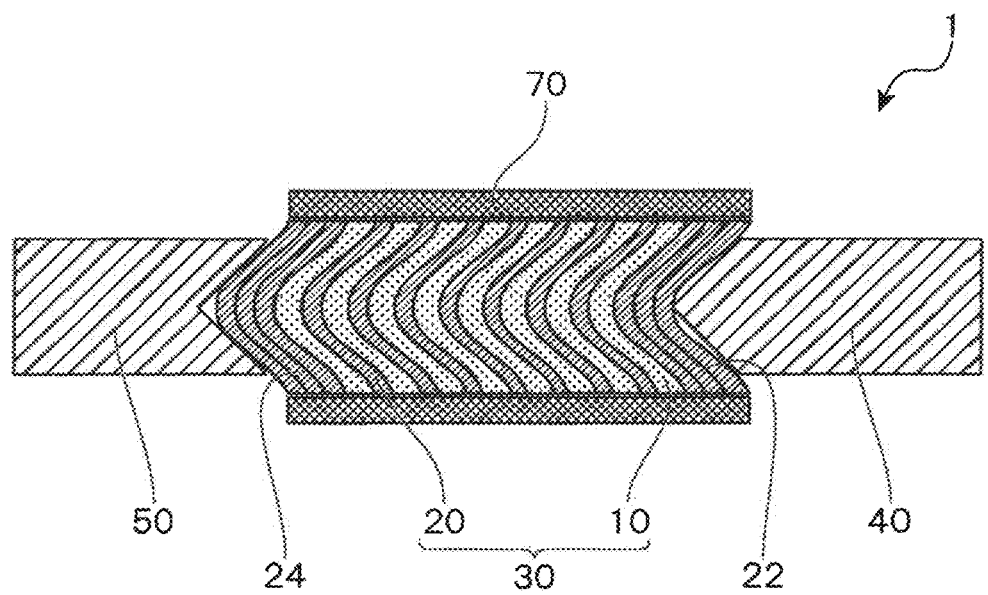
FIG. 2 is a schematic cross-sectional view of the spiral-wound gasket shown in FIG. 1.

FIG. 2 is a schematic cross-sectional view of the spiral-wound gasket shown in FIG. 1. As shown in FIGS. 1 and 2, the spiral-wound gasket 1 has a structure in which a spiral-wound gasket main body 30 obtained by spirally winding a hoop 20 and a filler 10 in a stacked state is held by an outer ring 50 and an inner ring 40. In the spiral-wound gasket main body 30, on its both annular surface (exposed surface), sheet parts 70 formed of exfoliated clay minerals are stacked. The thickness of the sheet part is 0.05 to 10 mm, for example.

Preferably, as shown in FIG. 2, in the spiral-wound gasket 1, at the inner periphery of the gasket main body 30, an inner peripheral no-filler part 22 obtained by winding only the hoop 20 is formed. Further, preferably, at the outer periphery of the gasket main body 30, an outer peripheral no-filler part 24 obtained by winding only the hoop 20 is formed.

The thickness of the filler 10 is not restricted, but is normally 0.05 to 1.0 mm. The thickness of the hoop 20 is not restricted, but is normally 0.1 to 0.6 mm. The filler 10 between the hoop 20 may be protruded from the hoop 20.

The thickness of the gasket main body 30 is not restricted, but normally 1 to 5 mm. The thickness of each of the inner ring 40 and the outer ring 50 is normally smaller than the thickness of the gasket main body 30, and is not restricted. However, normally, the thickness is 2 to 6 mm.

The spiral-wound gasket according to this embodiment may be provided with the inner ring 40 and the outer ring 50 as shown in FIG. 1, but may be provided with only the outer ring 50 or only the inner ring 40.

As for the spiral-wound gasket 1, by covering the surface of the gasket main body 30 with the sheet part 70, intimacy with joints (flange) of various pipes is improved, whereby leakage from contact surface can be suppressed. In addition, since burn-out of a filler can be prevented, the sealing property of the gasket itself can be improved.

In FIGS. 1 and 2, the sheet parts 70 cover both annular surfaces of the gasket main body 30. According to need, only one surface may be covered. In FIGS. 1 and 2, the sheet part 70 covers such that it covers the entire part of the annular surface of the gasket main body 30. However, it may cover part thereof.

Figure 3:
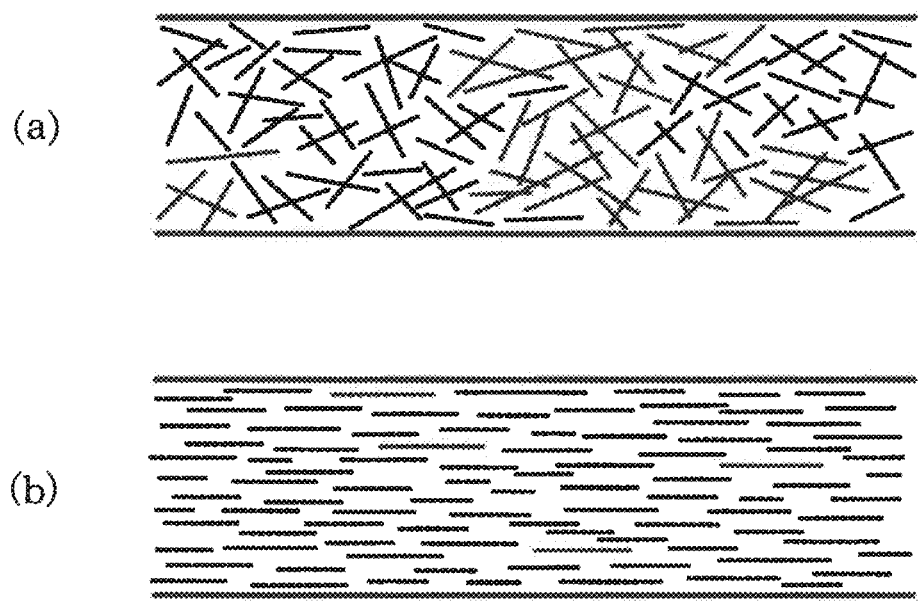
FIG. 3 are schematic cross-sectional views of a sheet in which exfoliated clay minerals are assembled without being oriented and a sheet in which exfoliated clay minerals are assembled with being oriented.

A sheet in which exfoliated clay minerals are assembled without being oriented is a sheet, as shown in FIG. 3(a), in which exfoliated clay minerals are not oriented, and arranged irregularly to have minute gaps inside. Such a sheet has a large compression amount and is capable of absorbing unevenness or deformation on a flange surface, and thus the quantity of leakage from the contact surface tends to be small when used in a flange having unevenness on the surface. In contrast, in a sheet in which exfoliated clay minerals are oriented, as shown in FIG. 3(b), there are less gaps inside. Such a sheet has a small compression amount and is not capable of absorbing unevenness or deformation on a flange surface, and thus the quantity of leakage from the contact surface tends to be large when used in a flange having unevenness on the surface.

The above-mentioned exfoliated clay minerals may be either natural clay minerals or synthetic clay minerals. For example, mica, vermiculite, montmorillonite, iron montmorillonite, beidellite, saponite, hectorite, stevensite, or nontronite can be exemplified. These clay minerals are laminar compounds in which flakes are stacked in a layer form.

The thickness of the exfoliated clay minerals forming the sheet part is normally 0.5 to 1000 nm. Such exfoliated clay minerals can be obtained by various methods.

For example, a method in which clay minerals are peeled off (exfoliated) by repeating washing with alcohol (JP-A-2008-13401, etc.), a method in which a thin nano-sheet is prepared by a sol-gel method (Japan Patent No. 2958440, JP-A-2013-32438, etc.), a method in which clay minerals are used and freeze drying is conducted (JP-A-1997-315877, JP-H09-315877, Japan Patent No. 2636204, JP-A-2009-242617, etc.), a method in which clay minerals are fixed with a resin in an exfoliated state, and the resin is burnt off in that state (JP-A-2003-550652, etc.) and other methods (JP-A-H06-172058, JP-A-2009-234867, JP-A-2012-201550, etc.) or the like can be given. Expandable clay minerals can be peeled off only by putting in water and stirring.

As the exfoliated clay minerals, an exfoliated body obtained by peeling off clay minerals can be used. This exfoliated body is preferably formed of one layer, or may be an exfoliated body in which plural layers are laminated. The degree of exfoliation of the exfoliated body is strongly correlated with the thickness of the laminate or the bulk density of the laminate. A smaller bulk density means a thin laminate.

As for the exfoliated body obtained by peeling the above-mentioned clay minerals, a smaller bulk density is preferable since the compression amount is large. The bulk density of the exfoliated body obtained by peeling the clay minerals is preferably 0.4 g/cm$^3$ or less. Within this range, it is possible to obtain an appropriate compression amount, and further, is possible to obtain a sheet having a bending strength that can resist punching. The bulk density of the sheet part is preferably 0.2 g/cm$^3$ or less, more preferably 0.1 g/cm$^3$ or less.

The density of the sheet part is preferably 1.6 g/cm$^3$ or less, more preferably 1.5 g/cm$^3$ or less, further preferably 1.4 g/cm$^3$ or less, and most preferably 1.1 g/cm$^3$ or less. The smaller the density of the sheet part, the larger the compression ratio due to a large amount of gaps. The lower limit is not restricted, but is normally 0.25 g/cm$^3$ or more.

The compression ratio of the sheet part is preferably 10% or more when measured by the method described in the Examples, e.g. It can exceed 15%, or be 17% or more, 18% or more or 20% or more. The upper limit is not restricted, but is normally 90% or less. If the compression ratio is large, it is possible to maintain intimacy with a flange. The compression ratio is more preferably 23% or more, further preferably 25% or more.

The bending strength of the sheet part is preferably 2.0 MPa or more, more preferably 3.0 MPa or more, when measured by the method described in the Examples. If the bending strength is high, the sheet part can sufficiently resist punching, etc. The upper limit is not particularly restricted, but is normally 25 MPa or less.

The amount of bending fracture is preferably 0.4 mm or more, more preferably 0.43 mm or more. If the amount of bending fracture is large, the sheet part has high flexibility.

The void ratio of the sheet part means the ratio of the total sum of the volumes of voids contained in the sheet part that have a longer diameter of 15 μm or more to the volume of the sheet part. In respect of strength, it is preferred that the void ratio of voids having a longer diameter of 15 μm or more be 3 vol % or less when measured by the method described in the Examples. More preferably, the void ratio is 1.5 vol % or less.

The quantity of leakage of the sheet part in a surface direction at a clamping pressure of 34 MPa is preferably 0.4 atmcc/min or less, more preferably 0.35 atmcc/min or less, and further preferably 0.2 atmcc/min or less when measured by the method described in the Examples.

As for the sheet part in which exfoliated clay minerals are assembled without being oriented, the gas (helium gas) transmission coefficient in the thickness direction when measured by the methods described in the Examples can be increased. For example, the gas transmission coefficient in the thickness direction can be $3.7\times10^{-5}$ cm$^2$s$^{-1}$cmHg$^{-1}$ or more.

The sheet part can be produced by gathering exfoliated clay minerals without being oriented and formed into a sheet-like shape. Specifically, clay minerals are exfoliated and a dispersion in which exfoliated clay minerals are dispersed is freeze-dried, followed by compression molding, whereby a sheet in which exfoliated clay minerals are assembled without being oriented can be produced.

Within a range that does not impair the advantageous effects of the invention, the sheet part may comprise a binder or the like in addition to exfoliated clay minerals. 90 wt % or more, 95 wt % or more, 98 wt % or more or 100 wt % of the sheet part may be composed of exfoliated clay minerals.

The gasket main body members (filler, hoop, etc.) other than the sheet part, the inner ring and the outer ring are not particularly restricted, and conventional elements can be used.

For example, as for the filler, expanded graphite, mica, inorganic fibers or the like can be used singly or in combination. The hoop is normally a metal belt-like thin plate having an approximate V-shaped cross section. For example, the hoop is formed of a stainless steel belt such as SUS304 and SUS304L. The inner ring and the outer ring are normally made of a metal, and as examples of the metal, stainless steel, carbon steel, or the like can be given.

Subsequently, the method for producing a spiral-wound gasket according to the invention will be explained.

The spiral-wound gasket according to the invention can be produced by stacking a hoop and a filler and winding the resulting stacked body spirally to produce a gasket main body, and adhering or arranging a sheet part formed of exfoliated clay minerals on one surface or the both surfaces of the resulting gasket main body. As for the method of producing the spiral-wound gasket main body, a conventional production method can be used.

When covering a surface of the gasket main body with the sheet part, if the filler is protruded from the surface in the gasket main body, the protruded filler may be shaved off by a polishing means before covering or may not be shaved.

Covering of the sheet part is not particularly restricted. However, for example, it can be conducted by using an adhesive such as glue. In place of adhesion, putting the sheet part formed of exfoliated clay minerals on the exposed surface may suffice.

For example, when using in a flange of a pipe extending in a substantially vertical direction, one sheet part is placed on a lower flange, and the other sheet part is placed on the gasket main body. In this state, the gasket main body is clamped between the flanges.

<Serrated Gasket Covered by Sheet Part>

The serrated gasket as a second embodiment of the invention will be explained with reference to the drawings.

The serrated gasket according to this embodiment differs from the spiral-wound gasket according to the first embodiment in that the gasket main body is a serrated gasket main body. As for the same elements as those of the first embodiment, the same numerical references as those in the first embodiment are used, and an explanation is omitted.

Figure 4:
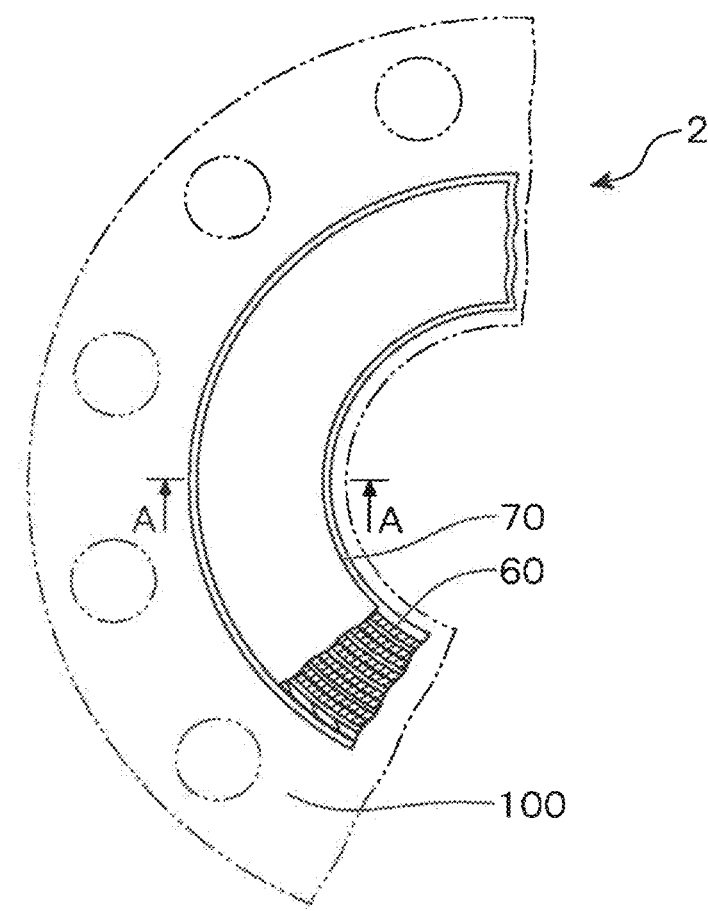
FIG. 4 is a schematic partially broken plan view of part of a serrated gasket as a second embodiment of the invention.
Figure 5:
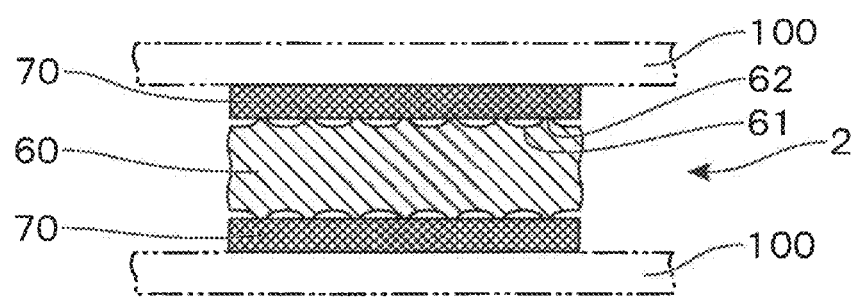
FIG. 5 is a schematic cross sectional view taken along line A-A of FIG. 4.
Figure 6:
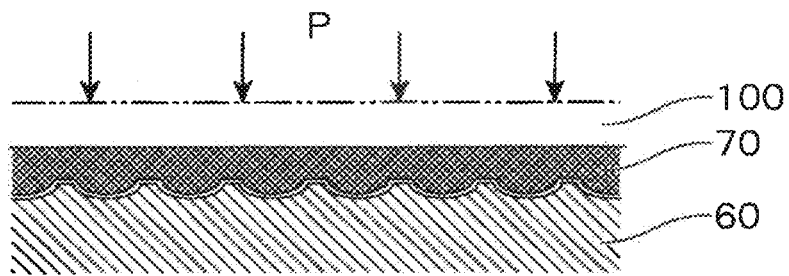
FIG. 6 is a view explaining the state of deformation by clamping of the sheet part.

FIG. 4 is a partially broken plan view showing part of the serrated gasket 2 provided on the flange 100, FIG. 5 is a cross-sectional view taken along the line A-A in FIG. 4 and FIG. 6 is a view showing the state of deformation of the sheet part by clamping.

As shown in FIGS. 4 and 5, in the serrated gasket 2, on both annular surface of the serrated gasket main body 60, the sheet part 70 are located. In the serrated gasket main body 60, plural concentric grooves 61 differing in diameter are formed. That is, as shown in FIG. 5, grooves 61 are formed between adjacent tooth (saw tooth) 62.

As for the shape of the saw tooth 62, those having a cross section of a triangle, a trapezoid. etc. can be given. As for the shape of the groove 61, those having a cross section of inverted trapezoidal, concave and arcuate, substantially V-shape. etc. can be given.

As shown in FIG. 6, in the serrated gasket 2, the sheet part 70 is flown into groove portions formed between saw teeth by clamping (P), whereby excellent sealing property is exhibited even at a low surface pressure. Further, since the sheet part is adhered onto the surface, intimacy with the flange surface is excellent. In addition, the front end of the saw tooth does not directly contact the flange, and the flange surface is not damaged.

The serrated gasket main body 60 is normally made of a metal. As the material, stainless steel such as stainless 316L steel and stainless 304 steel, and other alloy steels can be given.

As in the case of the spiral-wound gasket, an outer ring and/or an inner ring (not shown) may be attached to the serrated gasket 2. On the outer peripheral surface (side surface) thereof, a groove for engaging the outer ring may be formed.

The sheet part 70 is the same as the sheet part used in the spiral-wound gasket, and hence, an explanation is omitted.

Subsequently, one example of the production method of the serrated gasket 2 will be explained. A plate-like stainless steel plate is subjected to laser processing or bending processing into a ring-like form, and on both surfaces (flat surfaces) of the resulting ring-like product, concentric grooves differing in diameter are formed at an almost equal interval by cutting by a lathe, whereby the serrated gasket main body is obtained. On the both surfaces of the resulting serrated gasket main body, the sheet part is attached by an adhesive.

The method for attaching the sheet part is the same as that in the spiral-wound gasket, and hence, an explanation thereof is omitted.

<Spiral-wound Gasket in which a Filler Contains Exfoliated Clay Minerals>

The spiral-wound gasket as the third embodiment of the invention will be explained with reference to the drawings.

The spiral-wound gasket according to this embodiment differs from the spiral-wound gasket according to the first embodiment in that the filler contains exfoliated clay minerals and that there is no need to be covered by the sheet part. Hereinbelow, the same reference numerals are given to the same elements as those in the first embodiment, and an explanation will be omitted.

Figure 7:
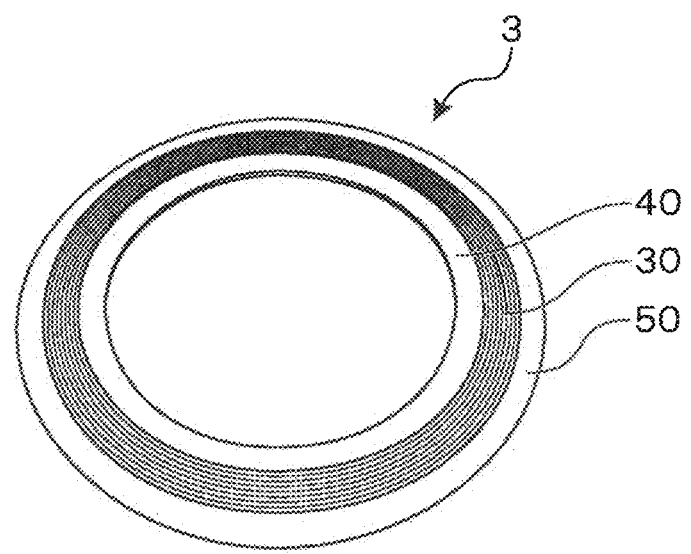
FIG. 7 is a schematic perspective view of a spiral-wound gasket as a third embodiment of the invention.
Figure 8:
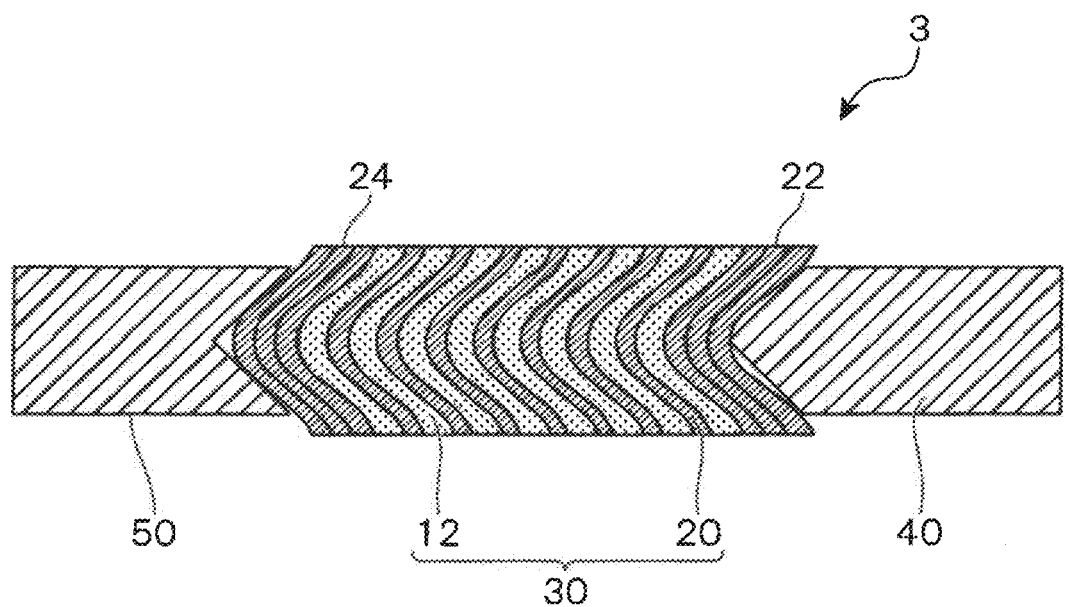
FIG. 8 is a schematic cross-sectional view of the spiral-wound gasket shown in FIG. 7.

FIG. 7 is a perspective view showing one embodiment of the spiral-wound gasket of the invention and FIG. 8 is a cross-sectional view thereof.

The filler 12 used in this spiral-wound gasket 3 is a tape-like or plural strip-like sheet parts. This sheet part is the same as the sheet part 70 in the first embodiment. Since it is used as a filler, the thickness is normally 0.05 to 1.0 mm.

The sheet part (filler) used in this embodiment contains a binder in addition to exfoliated clay minerals. As the binder, rubber, an adhesive or the like can be exemplified. The binder includes acrylonitrile butadiene rubber, styrene butadiene rubber, polybutadiene rubber, silicone rubber, acrylic rubber, natural rubber, butyl rubber, chloroprene rubber, ethylene propylene rubber, fluororubber, urethane rubber, acrylic adhesive or silicone adhesive. The binder is preferably acrylonitrile butadiene rubber or silicone rubber. The binder can impart flexibility to the filler.

The amount of the binder is preferably 0.3 to 20 wt % of the filler. If the amount of a binder is less than 0.3 wt %, the flexibility may be insufficient. If the amount of the binder exceeds 20 wt %, properties such as sealing property may be deteriorated. The amount of the binder is more preferably 0.5 to 15 wt %, with 1 to 10 wt % being further preferable.

The filler may be formed only of exfoliated clay minerals and a binder, or only of exfoliated clay minerals, with containing inevitable impurities.

The spiral-wound gasket according to the embodiment can be produced in the same manner as in the case of the spiral-wound gasket of the first embodiment.

EXAMPLES

Production Example 1

(1) Preparation of Montmorillonite Nano-sheet

As clay, 2 g of "Kunipia M" (manufactured by Kunimine Industries, Co., Ltd.) as natural montmorillonite was added to 98 g of distilled water. The resultant was put in a glass-made beaker together with a stirrer chip made of Teflon (registered trademark), and stirred by means of a magnetic stirrer, whereby a homogenous clay dispersion was obtained. The resulting clay dispersion was frozen by using liquid nitrogen. The resultant was then freeze-dried by means of a freeze drier "FDU-2110" (manufactured by Tokyo Rika Kikai Co., Ltd.), whereby exfoliated strips of montmorillonite (montmorillonite nanosheet) (exfoliated clay materials) were obtained.

The bulk density of the exfoliated strips was measured by the following method. The results are shown in Table 1.

The bulk density was measured by using an electronic balance "MC-1000" (manufactured by A&D Company, Ltd.) at room temperature of 23° C. First, the weight of a metal cylindrical container having an inner diameter of 20 mm (volume: 25 cm$^3$) was measured. To this container, an excessive amount of the exfoliate strips was put, and part of the exfoliated strips that was overflown from the container was levelled off by a metal plate. The weights of the container and the exfoliate strips were measured, and the bulk density of the exfoliated strips was calculated by the following formula:

$$\text{Bulk density} = \frac{W_1 - W_0}{V}$$

$W_0$: Metal container [g]
$W_1$: Weight of the exfoliated strips and the metal container [g]
V: Volume of metal container [cm$^3$]
(2) Preparation of Sheet 0.844 g of the exfoliated strips of the montmorillonite was put in a mold (having a cylindrical recess with a diameter of 34 mm and a depth of 1 mm), and was subjected to compression molding with a flat and smooth metal plate such that the thickness became 1 mm to obtain a sheet.

The density and thickness of the sheet were 0.93 g/cm$^3$ and 1 mm, respectively.

Figure 9:
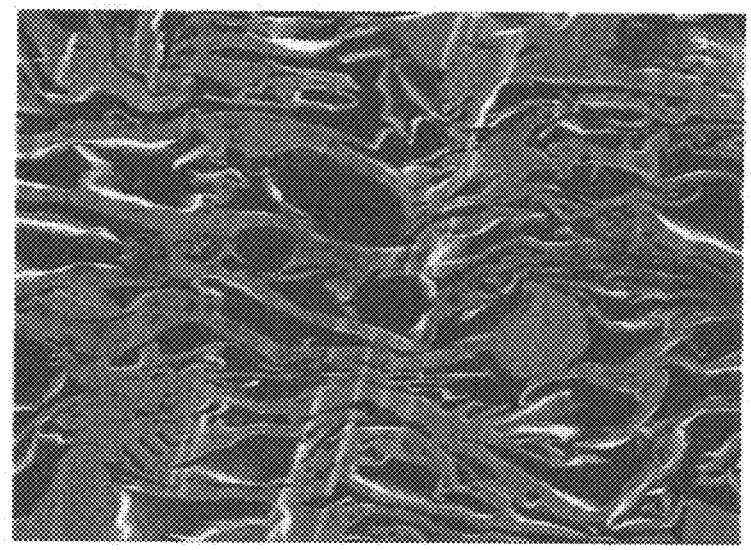
FIG. 9 is a scanning electron microscope photograph of the cross section of the sheet obtained in Production Example 1.

A scanning electron micrograph of the cross section of the obtained sheet is shown in FIG. 9. It can be understood that the exfoliated strips (montmorillonite nanosheet) were assembled irregularly without being oriented.

The montmorillonite nanosheet was a single layer or a laminate. As a result of measuring the thickness at 10 points by means of a field emission scanning electron microscope "JSM76000" (manufactured by JEOL, Ltd.), the thickness was found to be 10 to 800 nm.

Production Example 2

Exfoliated strips of montmorillonite were obtained in the same manner as in Production Example 1, except that 30 g of "Kunipia M" (manufactured by Kunimine Industries, Co., Ltd.) as natural montmorillonite was added to 70 g of distilled water. A sheet was prepared in the same manner as in Production Example 1 by using 0.853 g of the exfoliated strips of montmorillonite.

Production Example 3

Exfoliated strips of vermiculite were obtained in the same manner as in Production Example 1, except that, as clay, one obtained by pulverizing chemically-treated vermiculite "Micro Light Powder (registered trademark)" (manufactured by Specialty Vermiculite Corporation) in a mortar such that the median diameter D50 became 4 µm was used. A sheet was prepared in the same manner as in Production Example 1 by using 0.898 g of the exfoliated strips of vermiculate.

Production Example 4

Exfoliated strips of mica were obtained in the same manner as in Production Example 1, except that, as clay, swelling mica "DMA-350" that was sodium tetrasilicate mica (manufactured by Topy Industries Limited.) was used. A sheet was prepared in the same manner as in Production Example 1 by using 0.889 g of this exfoliated strips of mica.

Production Example 5

A sheet was prepared in the same manner as in Production Example 1, except that 1.27 g of the exfoliated strips of mica obtained in Production Example 4 was used.

Production Example 6

Exfoliated strips of mica were obtained in the same manner as in Production Example 1, except that, as clay, 30 g of swelling mica "DMA-350" that was sodium tetrasilicate mica (manufactured by Topy Industries Limited.) was used. By using 0.453 g of these exfoliated strips of mica, a sheet was prepared in the same manner as in Production Example 1.

Evaluation Example 1

For the sheets obtained in Production Examples 1 to 6, the following properties were measured. The results are shown in Table 1.
(a) Compression Amount and Compression Ratio A compression ratio means a value obtained from a ratio of a deformation amount when the sheet was compressed under 34 MPa (corresponding to a surface pressure that is normally applied to a gasket of a pipe or the like) to the initial thickness.

The compression ratio of a sheet sample was measured by means of a universal material testing machine "AG-100kN" (manufactured by Shimadzu Corporation). First, with an aim of measuring the distortion of the compression testing machine itself, a metal cylindrical plate having a diameter of 15 mm and a thickness of 2 mm was compressed at a speed of 0.1 mm/min, and distortion when compressed under 34 MPa was measured in advance.

Subsequently, a sample with a diameter of 15 mm and a thickness of 1 mm±0.05 mm was compressed at a rate of 0.1 mm/min. Distortion when a load of 34 MPa was applied was measured, and the compression amount and the compression ratio were calculated from the following formulas.

$$\text{Compression amount} = \varepsilon_1 - \varepsilon_0 \quad \text{Compression ratio} = 100 \times \frac{\varepsilon_1 - \varepsilon_0}{t}$$

$\varepsilon_1$: Distortion [mm] when the sample was compressed under 34 MPa
$\varepsilon_0$: Distortion [mm] when the metal plate was compressed under 34 MPa
t: Initial thickness [mm]
(b) Bending Strength The bending strength of the sheet sample was measured by means of a dynamic viscoelasticity spectrometer "RSAIII" (manufactured by TA Instruments Japan, Inc.). The sample used for the measurement had a width of 10 mm, a length of 20 mm and a thickness of 1 mm. The measurement was conducted by the 3-point bending test under the condition of an inter-fulctrum distance of 10 mm and a testing speed of 1 mm/min. The maximum load was measured and the bending strength was calculated by the following formula.

$$\sigma = \frac{3FL}{2bh^2}$$

$\sigma$: Bending strength [N/mm$^2$]
F: Flexural load [N]
L: Inter-fulctrum distance [mm]
b: Width of sample [mm]
h: Thickness of sample [mm]

(c) Void Ratio

The void ratio of the sample was measured by means of an X-ray CT apparatus "SKYSCAN1072" (manufactured by Bruker-microCT Co., Ltd.). The sample for the measurement was carefully cut by means of a laser blade such that it became a cube having a length of one side of 1 to 2 mm and no cracks were caused by the cutting.

The measurement conditions of an X-ray CT apparatus were as follows:

Magnification: 120.2 times (dissolution capability: 2.28 µm/pixel)

Tube voltage of X ray: 100 kV

Tube current: 98 µA

Under these conditions, the sample was rotated at an exposure time of 1.1 second, 2 frames and a rotation step of 0.230 from 0 to 180°, and a transmitted image was acquired. Not only the sample but also a space around the sample was photographed. A line profile of the transmitted image was confirmed, and the gain was adjusted such that a difference was observed between the sample part and the space part.

For the transmitted image thus acquired, by using a reconfiguration software "nRecon" (manufactured by Bruker-microsoft Co., Ltd), a CT value (black, white and gray values of an image) was set such that the peaks of the space part and the sample part were completely entered, whereby reconfiguration was conducted to obtain 3D data.

Next, from the 3D data, by using software "VGStudioMAX" (manufactured by Volume Graphics, Inc.), a part that had not been destroyed by cutting was extracted as a region of interest (300×320×230 pixels), and the median values of both peaks were read from the histograms of the gray value of space and sample.

This gray value was segmented as the threshold value of the void, and the volume of each void was measured by the Marching Cubes method.

From the measured volumes, voids having a diameter of 15 µm or more were extracted, and the ratio of the total sum of voids having a diameter of 15 µm or more to the total volume in the region of interest was taken as a void ratio (vol %).

(d) Quantity of Leakage in the Plane Direction (Sealing Properties)

The sealing properties in the plane direction of the sheet were measured by the pressure-drop method. Specifically, a sample was used which was obtained by punching a sheet sample into a donut-like form having an outer diameter of 30 mm and an inner diameter of 15 mm by means of a Thomson blade. The sample was placed on a metal plate (made of SUS304, diameter: 100 mm, thickness: 50 mm, average surface roughness: Ra=0.5 µm, central bore diameter: 3 mm) having a central bore through which a testing gas was applied. They were mounted in a universal material testing machine "AG-100kN" (manufactured by Shimadzu Corporation). Using a metal plate made of SUS304 (diameter: 100 mm, thickness: 50 mm, average surface roughness: Ra=0.5 µm) as a compression plate, the sample was compressed at a rate of 5 mm/min until a pressure of 34 MPa was applied to the sample.

In order to measure the volume of the inside of the pipe container used in this test, nitrogen gas was supplied on the inner diameter side of the sample such that the inner pressure became 1 MPa. Then, the valve was closed to form a seal. To this, a pipe (485.56 cm³) for which the inner volume of the pipe container had been measured in advance was connected, and the inner pressure was released. The residual pressure at this time was measured, and the volume inside the pipe container was calculated by the following formula.

$$V = \frac{P_1 \times V_0}{(P_0 - P_1)}$$

V: Volume of the inside of pipe container [m³]

$V_0$: Volume of the inside of pipe container that has been measured in advance [m³]

$P_0$: Initially applied pressure [MPa]

$P_1$: Pressure at the time of release [MPa]

Then, nitrogen gas was supplied on the inner diameter side of the sample such that the inner pressure became 1 MPa. The time until the inner pressure was lowered to 0.9 MPa was measured. The quantity of leakage in the plane direction was calculated by the following formula. The test was all conducted in a room at 23±0.5° C.

$$Q = \frac{V(P_a - P_b)}{\Delta t}$$

Q: Quantity of leakage [atmcc/min]

V: Volume of the inside of pipe container [m³]

$P_a$: Pressure on inner side of sample when detection started [MPa]

$P_b$: Pressure on inner side of sample when detection was completed [MPa]

Δt: Time from the start of detection to completion of detection [min]

(e) Permeation Coefficient in the Thickness Direction

The gas permeation coefficient in the thickness direction was measured according to the differential pressure method (JIS K7126-1) by means of a differential gas permeability tester "GTR-30ANI" (manufactured by GTR Tec Corporation). A sample used for the measurement was obtained by cutting a sheet having a thickness of 0.5 mm by means of a cutter knife such that the diameter became 58 mm. The measurement conditions of the gas permeability coefficient were as follows. Sample temperature was 30° C.; measurement cell had a transmission cross section of 15.2 cm²; helium gas was pressurized under 0.049 MPa; and differential pressure was 0.149 MPa. The quantity of a helium gas that had transmitted at a differential pressure of 0.149 MPa for an arbitrary period of time was measured. The permeability coefficient was calculated by the following formula. All of the tests were conducted in a room at a temperature of 23±0.5° C.

$$GTR = \frac{Q \times T}{A \times t \times \Delta P}$$

GTR: Gas permeability coefficient [cm²·sec⁻¹·cmHg⁻¹]

Q: Quantity of leakage [cm³]

T: Sample thickness [cm]

A: Transmission cross sectional area [cm²]

t: Testing time [sec]

ΔP: Differential pressure [cmHg⁻¹]

TABLE 1

| | Production Ex. 1 | Production Ex. 2 | Production Ex. 3 | Production Ex. 4 | Production Ex. 5 | Production Ex. 6 |
|---|---|---|---|---|---|---|
| Material | Montmorillonite | Montmorillonite | Vermiculite | Mica | Mica | Mica |
| Bulk density of exfoliated strips [g/cm$^3$] | 0.0068 | 0.151 | 0.021 | 0.013 | 0.013 | 0.18 |
| Sheet density [g/cm$^3$] | 0.93 | 0.94 | 0.99 | 0.98 | 1.40 | 1.36 |
| Sheet thickness [mm] | 1 | 1 | 1 | 1 | 1 | 1 |
| Compression amount when pressure of 34 MPa was applied [mm] | 0.500 | 0.534 | 0.526 | 0.463 | 0.26 | 0.262 |
| Compression ratio when pressure of 34 MPa was applied [%] | 49% | 53% | 53% | 46% | 25% | 26% |
| Bending strength [MPa] | 5.2 | 1.3 | 2.3 | 1.8 | 4.0 | 1.1 |
| Void ratio [vol %] | 0.70% | 2.40% | 0.80% | 1.10% | 0.00% | 2.60% |
| Quantity of leakage in plane direction when fastening surface pressure of 34 MPa was applied [atmcc/min] | 0.0084 | 0.0104 | 0.263 | 0.164 | 0.339 | 0.314 |
| Transmission coefficient in thickness direction [cm$^2$s$^{-1}$cmHg$^{-1}$] | >3.7 × 10$^{-5}$ | >3.7 × 10$^{-5}$ | >3.7 × 10$^{-5}$ | >3.7 × 10$^{-5}$ | >3.7 × 10$^{-5}$ | >3.7 × 10$^{-5}$ |

Production Example 7

(1) Production of Mica Nano-sheet

Exfoliated strips of mica (mica nano-sheet) were obtained in the same manner as in Production Example 1, except that 20 g of swelling mica "NTS-10" that was sodium tetrasilicate mica (solid content: 10 wt %, manufactured by Topy Industries Limited.) was added to 80 g of distilled water.

(2) Preparation of Sheet 1.134 g of the thus prepared exfoliated strips of mica was put in a mold (cylindrical mold with recesses, having a diameter of 85 mm and a depth of 0.2 mm) and compressed by means of a smooth metal plate such that the thickness became 0.2 mm, whereby a sheet was obtained. The density of the sheet was 1.0 g/cm$^3$ and the thickness of the sheet was 0.2 mm.

<Spiral-wound Gasket Covered with Sheet Part>

Example 1

A hoop of a tape-like thin plate (thickness: 0.2 mm, width: 5.3 mm) made of SUS316 was drawn to have a substantially V-shape. Thereafter, it was spot-welded to the outer peripheral part of an inner ring made of SUS316. After winding the hoop alone three times, as the filler, an expanded graphite tape having a thickness of 0.381 mm and a width of 6.2 mm (sheet density: 1 g/cm$^3$) was sandwiched, and they were overlapped. The resulting members were wound 9 times. After winding the hoop alone three times, the spot welding was conducted as in the case of the start of winding. Finally, a SUS316-made outer ring was mounted, and only the filler protruded from the hoop was cut, whereby a spiral-wound gasket main body was prepared.

To ring-like sheets part having an outer diameter of 69.8 mm and an inner diameter of 54.1 mm obtained by punching the sheet prepared in Production Example 7 by means of a Thomson blade, spray glue (spray glue 77, manufactured by 3M Japan Limited) was applied, and the sheets were attached to each surface (a part from which the filler was shaved off) of the above-mentioned spiral-wound gasket main body, whereby a spiral-wound gasket was prepared.

Comparative Example 1

A spiral-wound gasket was obtained in the same manner as in Example 1, except that the sheet parts were not attached. This spiral-wound gasket corresponds to the spiral-wound gasket of Patent Document 1.

Comparative Example 2

A hoop of a tape-like thin plate (thickness: 0.2 mm, width: 5.3 mm) made of SUS316 was drawn to have a substantially V-shape. Thereafter, it was spot-welded to the outer peripheral part of an inner ring made of SUS316. After winding the hoop alone three times, as the filler, a mica tape (manufactured by Japan Mica Industries, Co., Ltd, thickness: 0.21 mm, width: 6.8 mm) was sandwiched and they were overlapped. The resulting members were wound four times, and thereafter, an expanded graphite tape (sheet density: 1 g/cm$^3$, thickness: 0.381 mm, width: 6.2 mm) was wound twice. Further, the above-mentioned mica tape was wound four times again, and finally, the hope alone was wound three times. Spot welding was conducted in the same manner as in the start of winding. Finally, an outer ring made of SUS316 was mounted, whereby a spiral-wound gasket was prepared. This spiral-wound gasket corresponds to the spiral-wound gasket of the Patent Document 2.

Evaluation Example 2

As for the spiral-wound gaskets obtained in Example 1 and Comparative Examples 1 and 2, the quantity of leakage (sealing property at normal temperature and after heating) was measured by the following method. The results are shown in FIG. 10.

Figure 10:
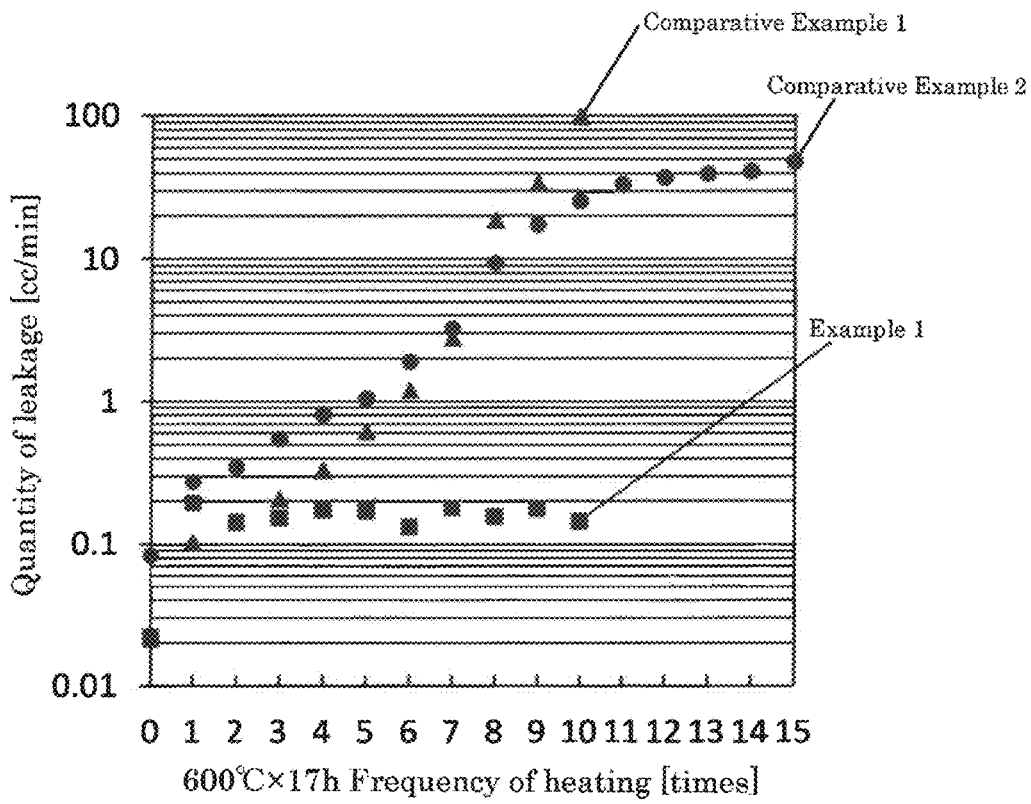
FIG. 10 is a graph showing the quantity of leakage of the spiral-wound gaskets of Example 1, Comparative Examples 1 and 2.

From FIG. 10, it could be confirmed that the spiral-wound gasket of Example 1 could maintain sealing property after heating.

The quantity of leakage of the spiral-wound gasket was measured by the pressure drop method. Specifically, the quantity of leakage was measured by the following procedures. The prepared spiral-wound gasket was used as a test specimen, and was disposed between prescribed flanges (RF-type flange, material: SUS F304, nominal pressure: 150 LB, nominal diameter 2-½, surface roughness Ra=2.1 μm) and clamped at a clamping surface pressure of 44.2 MPa.

In order to measure the volume of the inside of the flange, a nitrogen gas was supplied on the inner diameter side of the test specimen such that the inner pressure became 1 MPa, and the valve was closed to form a seal. This was connected to a pipe (206.18 cm$^3$) of which the volume inside the pipe container had been measured in advance, and the inner pressure was released. The remaining pressure was measured, and the volume inside the pipe container was calculated by the following formula:

$$V = \frac{P_1 \times V_0}{(P_0 - P_1)}$$

V: Volume of the inside of pipe container [m$^3$]
$V_0$: Volume of the inside of pipe container that has been measured in advance [m$^3$]
$P_0$: Initially applied pressure [MPa]
$P_1$: Pressure at the time of release [MPa]

Then, nitrogen gas was supplied on the inner diameter side of the sample such that the inner pressure became 1 MPa. The time until the inner pressure was lowered to 0.9 MPa was measured. The quantity of leakage in the plane direction was calculated by the following formula. The test was all conducted in a room at 23±0.5° C.

$$Q = \frac{V(P_a - P_b)}{\Delta t}$$

Q: Quantity of leakage [atmcc/min]
V: Volume of the inside of pipe container [m$^3$]
$P_a$: Pressure on inner side of sample when detection started [MPa]
$P_b$: Pressure on inner side of sample when detection was completed [MPa]
$\Delta t$: Time from the start of detection to completion of detection [min]

Further, this flange was placed in a thermo-hygrostat (Super High-Temp Oven SSP H-101) (manufactured by Espec Corp.). In an air atmosphere, the temperature was elevated from 40° C. to 600° C. at a temperature elevation rate of 5° C./min. and kept at 600° C. for 17 hours. Then, the temperature was lowered to around room temperature by natural cooling. For the flange, a quantity of leakage was measured at a room of 23° C.±0.5° C. by the above method to obtain a quantity of leakage after heating,
<Spiral-wound Gasket in which Filler Contains Exfoliated Clay Minerals>

Example 2

(1) Preparation of Filler
To 80 g of distilled water, 0.0625 g of acrylonitrile butadiene rubber (NBR) latex "Nipol LX521" (solid content: 64 wt %, manufactured by Zeon Corporation) was added. The resultant was placed in a glass-made beaker together with stirrer chips made of Teflon (registered trademark), and stirred by means of a magnetic stirrer to obtain a uniform NBR dispersion. Further, to this dispersion, as clay, 20 g of expandable mica "NTS-10" that is sodium tetrasilicate mica (solid content: 10 wt %, manufactured by Topy Industries Limited.) was added, followed by sufficient stirring to obtain a homogenous clay dispersion.

This clay dispersion was frozen by using liquid nitrogen. This ice was frozen-dried by using a freeze dryer "FDU-2110" (manufactured by Tokyo Rikakikai Co., Ltd.), whereby a mixture of exfoliated strips of mica (exfoliated clay minerals) and NBR was obtained.

4 g of the prepared mixture was put in a mold (having a 10 cm-square quadrangular prism-like recess with a depth of 0.4 mm), and was subjected to compression molding with a flat and smooth metal plate such that the thickness became 0.4 mm to obtain a sheet. The sheet had a density of 1.0 g/cm$^3$ and a thickness of 0.4 mm.

The cross section of the resulting sheet was observed by a scanning electron microscope. Exfoliated strips of mica were irregularly assembled without being oriented.

The mica was a single layer or a laminate. As a result of measuring the thickness at 10 points by means of a field emission scanning electron microscope "JSM76000" (manufactured by JEOL, Ltd.), the thickness was found to be 10 to 800 nm.

This sheet was cut to prepare a filler having a width of 6.5 mm and a length of 100 mm.

(2) Preparation of Spiral-wound Gasket
By using the thus prepared filler, a spiral-wound gasket (JPI Class 300 1·½B) was obtained. Specifically, a hoop of a tape-like thin plate (thickness: 0.2 mm, width: 5.3 mm) made of SUS316 was drawn to have a substantially V-shape. Thereafter, it was spot-welded to the outer peripheral part of an inner ring made of SUS316. After winding the hoop alone three times, the filler was sandwiched, and they were overlapped. The overlapped members were wound 9 times. When a sheet was short, another sheet was added. After winding the hoop alone three times, the spot welding was conducted as in the case of the start of winding. Finally, a SUS316-made outer ring was mounted, whereby a spiral-wound gasket main body was prepared.

Example 3

A spiral-wound gasket was produced in the same manner as in Example 2, except that the amount of NBR latex "Nipol LX521" (solid content 64 wt %, manufactured by Zeon Corporation) was changed to 0.125 g.

Example 4

A spiral-wound gasket was produced in the same manner as in Example 2, except that the amount of NBR latex "Nipol LX521" (solid content: 64 wt %, manufactured by Zeon Corporation) was changed to 0.3125 g.

Evaluation Example 3

For the spiral-wound gaskets obtained in Examples 2 to 4 and Comparative Examples 1 and 2, the quantity of leakage (sealing property at normal temperature and after heating) was evaluated in the same manner as in Evaluation Example 2. The results are shown in FIG. 11.

Figure 11:
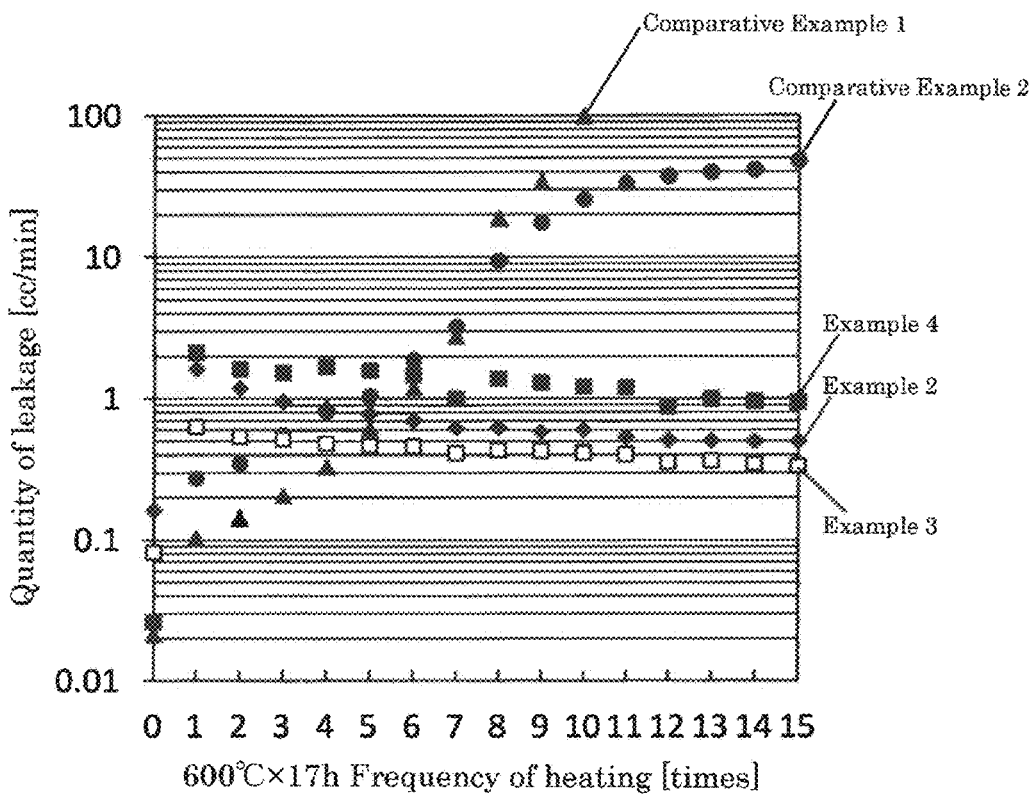
FIG. 11 is a graph showing sealing property of the spiral-wound gaskets produced in Examples 2 to 4 and Comparative Examples 1 and 2.

From FIG. 11, it can be understood that the spiral-wound gaskets according to Examples 2 to 4 can maintain the sealing property after heating.

Evaluation Example 4

For the fillers in Examples 2 to 4 and Comparative Example 1, the bending strength (Mpa) and the bending strain (mm) were measured by the following method. The results are shown in FIG. 12.

Figure 12:
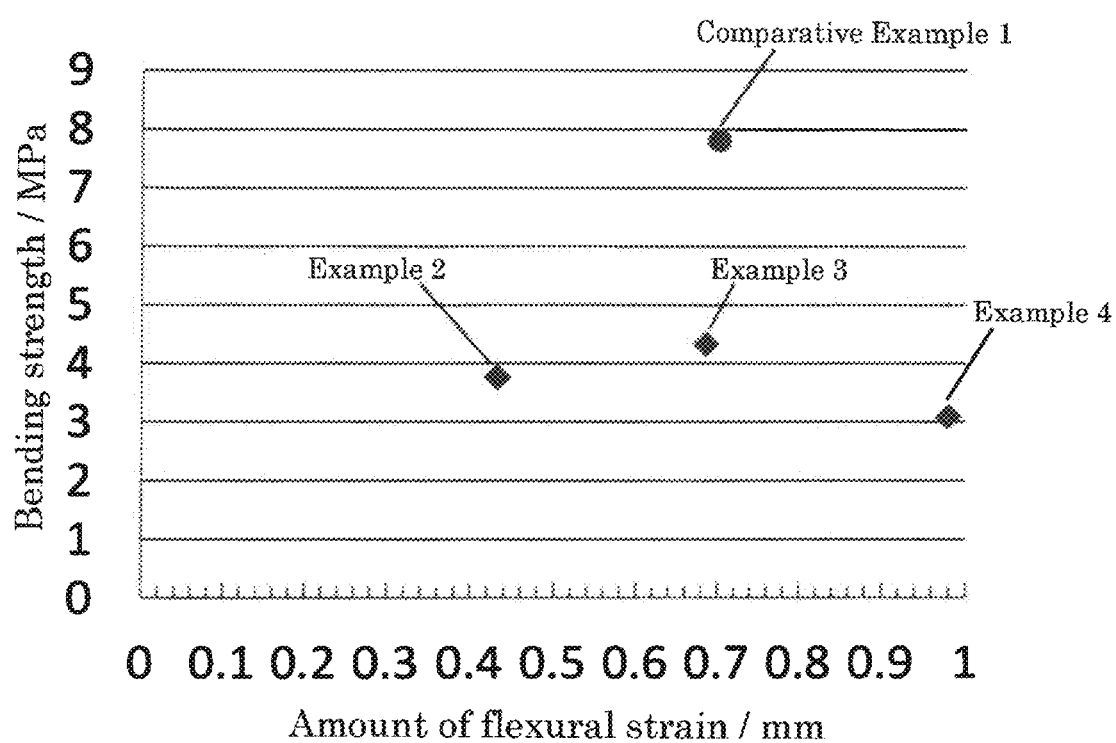
FIG. 12 is a graph showing bending strength and bending strain of the fillers used in Examples 2 to 4 and Comparative Example 1.

From FIG. 12, it can be understood that the filler according to claims 2 to 4 have flexibility enough to produce a spiral-wound basket.

A bending strength was calculated in the same manner as in Evaluation Example 1(b), except that the size of the sample used for the measurement was changed to a width of 10 mm, a length of 20 mm and a thickness of 0.4 mm. At this time, the amount of strain from a point at which the bending strength was 0.002 MPa to a point at which the bending strength was maximum was taken as the bending strain.

INDUSTRIAL APPLICABILITY

The gasket according to the invention can be used in equipment such as a heat exchanger or a joint of various pipes that are in a high-temperature and high-pressure state in petroleum refining, petrochemical plants, LNG plants, power plants, steel works, etc.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents stated in the description and the specification of Japanese applications on the basis of which the present application claims Paris Convention priority is incorporated herein by reference in its entirety.

The invention claimed is:

1. A spiral-wound gasket comprising a spiral-wound gasket main body in which a hoop and a filler are spirally wound, the filler comprising exfoliated clay minerals, wherein a quantity of leakage after repeating heating at 600° C. for 17 hours and cooling 10 times is 10 cc/min or less.

2. The gasket according to claim 1, wherein the filler futher comprises a binder.

3. The gasket according to claim 2, wherein the binder is one or more selected from acrylonitrile butadiene rubber, styrene butadiene rubber, polybutadiene rubber, silicone rubber, acrylic rubber, natural rubber, butyl rubber, chloroprene rubber, ethylene propylene rubber, fluororubber, urethane rubber, acrylic adhesive and silicone adhesive.

4. The gasket according to claim 1, wherein the exfoliated clay minerals are natural clay or synthetic clay.

5. The gasket according to claim 4, wherein the natural clay or the synthetic clay is mica, vermiculite, montmorillonite, iron montmorillonite, beidellite, saponite, hectorite, stevensite or nontronite.

6. The gasket according to claim 1, wherein a thickness of the exfoliated clay minerals is 0.5 nm to 1000 nm.

7. The gasket according to claim 1, wherein the exfoliated clay minerals are a single layer or a laminate of two or more layers.

8. The gasket according to claim 1, wherein the filler comprising a sheet part comprising exfoliated clay minerals.

9. The gasket according to claim 8, wherein the sheet part has a density of 1.6 g/cm$^3$ or less and has a compression ratio exceeding 15%.

10. The gasket according to claim 8, wherein a gas permeation coefficient of helium gas in a thickness direction of the sheet part is $3.7 \times 10^{-5}$ cm$^2$S$^{-1}$cmHg$^{31}$ $^1$ or more.

11. The gasket according to claim 8, wherein the exfoliated clay minerals are irregularly dispersed without being oriented in the sheet part.

12. A spiral-wound gasket comprising a spiral-wound gasket main body in which a hoop and a filler are spirally wound, one or both surfaces of the spiral-wound gasket main body being covered by a sheet part that comprises exfoliated clay minerals, wherein a quantity of leakage after repeating heating at 600° C. for 17 hours and cooling 10 times is 10 cc/min or less.

13. The gasket according to claim 12, wherein the exfoliated clay minerals are irregularly dispersed without being oriented in the sheet part.

14. A serrated gasket comprising a serrated gasket main body, one or both surfaces of the serrated gasket main body being covered by a sheet part that comprises exfoliated clay minerals, wherein a quantity of leakage after repeating heating at 600° C. for 17 hours and cooling 10 times is 10 cc/min or less.

15. The gasket according to claim 14, wherein the exfoliated clay minerals are irregularly dispersed without being oriented in the sheet part.

* * * * *